(12) United States Patent
Zhao et al.

(10) Patent No.: US 11,179,764 B1
(45) Date of Patent: Nov. 23, 2021

(54) MANUFACTURING PROCESS OF ARC-SHAPED BOTTOM TITANIUM CUP

(71) Applicant: ZHEJIANG FEIJIAN INDUSTRY AND TRADE CO., LTD., Jinhua (CN)

(72) Inventors: Hong Zhao, Yibin (CN); Linjun Wu, Chizhou (CN); Houhua Yang, Yibin (CN); Daohai Yang, Qianxinan Buyi (CN); Pin Yang, Yongkang (CN)

(73) Assignee: ZHEJIANG FEIJIAN INDUSTRY AND TRADE CO., LTD., Jinhua (CN)

( * ) Notice: Subject to any disclaimer, the term of this patent is extended or adjusted under 35 U.S.C. 154(b) by 0 days.

(21) Appl. No.: 17/231,003

(22) Filed: Apr. 15, 2021

(30) Foreign Application Priority Data

Sep. 24, 2020 (CN) .......................... 202011015146.5

(51) Int. Cl.
| | |
|---|---|
| *B21D 51/26* | (2006.01) |
| *B23K 26/28* | (2014.01) |
| *C25D 11/26* | (2006.01) |
| *C22F 1/18* | (2006.01) |
| *B21D 51/24* | (2006.01) |

(52) U.S. Cl.
CPC .............. *B21D 51/26* (2013.01); *B23K 26/28* (2013.01); *C22F 1/183* (2013.01); *C25D 11/26* (2013.01); *B21D 51/24* (2013.01)

(58) Field of Classification Search
CPC .... B21D 51/24; B21D 51/26; B21D 51/2653; B21D 51/2684; B23K 26/28; B23K 26/282; B23K 2101/12; B23K 2101/125; C22F 1/183; C21D 8/10
See application file for complete search history.

(56) References Cited

U.S. PATENT DOCUMENTS

| | | | |
|---|---|---|---|
| 6,253,440 B1* | 7/2001 | Chen ...................... | B21D 51/26 29/509 |
| 2017/0166382 A1* | 6/2017 | Huang ............... | B65D 81/3869 |

FOREIGN PATENT DOCUMENTS

| | | | | |
|---|---|---|---|---|
| CN | 109182937 A | * | 1/2019 | ............... C21D 7/08 |
| EP | 0211970 A1 | * | 3/1987 | ............. B23K 26/24 |

OTHER PUBLICATIONS

CN 109402526 A, Lan et al., Mar. 2019.*

* cited by examiner

*Primary Examiner* — Edward T Tolan

(57) ABSTRACT

The present disclosure provides a manufacturing process of an arc-shaped bottom titanium cup, including: S1: pressing an inner support ring; S2: primary crystallization; S3: matching; S4: welding opening parts; S5: pressing a titanium cup vacuum bottom; S6: welding the titanium cup vacuum bottom; S7: secondary crystallization; S8: vacuumizing; S9: detecting a thermal insulation function; S10: welding a titanium cup bottom plate; S11: surface polishing; and S12: oxidation processing. The present disclosure provides an inner support ring structure, the inner support ring always holds the titanium cup vacuum bottom round and maintains the titanium cup vacuum bottom in a high degree of roundness, thereby ensuring that a surface of a titanium cup shell and a titanium cup vacuum bottom is flat and smooth. The arc-shaped bottom titanium cup is clamped by adopting an upper mold and a lower mold, so that the arc-shaped bottom titanium cup is accurately limited.

10 Claims, 4 Drawing Sheets

MANUFACTURING PROCESS OF ARC-SHAPED BOTTOM TITANIUM CUP

TECHNICAL FIELD

The present disclosure relates to a manufacturing process of vacuum cups, in particular to a manufacturing process of an arc-shaped bottom titanium cup.

BACKGROUND

Titanium metal vacuum cups have excellent corrosion resistance, antibacterial properties, and heat preservation properties, and thus are deeply loved by consumers. However, in the present manufacturing process of the titanium cups, a crystallization or processing molding process easily causes a problem of out of roundness, where the larger an arc of vacuum bottoms, the more obvious the problem of out of roundness. Moreover, in a welding process of the titanium cups, an offset dislocation is easily generated and serious oxidation happens at a welding position, which further affects welding precision of cup bodies and the vacuum bottoms and finally affects consistency and flatness of appearance of the titanium cups.

SUMMARY

Due to a fact that the present manufacturing process of arc-shaped bottom titanium cups exists defects that large-arc vacuum bottom is easy to be out of roundness, welding is easy to shift and dislocation, welding positions are easy to oxidize, and so on, the present disclosure provides a new manufacturing process of an arc-shaped bottom titanium cup.

In order to solve above technical problems, the present disclosure provides a manufacturing process of an arc-shaped bottom titanium cup, including:

S1: pressing an inner support ring: taking the inner support ring and a pre-treated titanium cup shell; gradually pressing the inner support ring into the titanium cup shell from a bottom end of the titanium cup shell; forming an interference fit between the inner support ring and the titanium cup shell, and disposing part of the inner support ring outside the bottom end of the titanium cup shell.

S2: primary crystallization: carrying out the primary crystallization on the titanium cup shell and the inner support ring by adopting a vacuum furnace A; adjusting a vacuum degree in the vacuum furnace A to be less than 0.0001 Pa, setting temperature in the vacuum furnace A from 1100° C. to 1200° C. and continuously heating the titanium cup shell and the inner support ring for 3-10 hours, so that the titanium cup shell and the inner support ring are adhered together.

S3: matching: matching a pre-treated titanium cup inner container with the titanium cup shell after the step S2, so that forming a uniform vacuum layer gap between the titanium cup inner container and the titanium cup shell.

S4: welding opening parts: welding an opening part of the titanium cup inner container and an opening part of the titanium cup shell by adopting a continuous automatic laser welding equipment having a gas protection function, a welding power is from 200 W to 1500 W, a rotation speed is 1-30 revolutions per minute, and a welding time is from 1 second to 50 seconds, so that a titanium cup body is formed.

S5: pressing a titanium cup vacuum bottom: taking the pre-treated titanium cup vacuum bottom and the titanium cup body formed by the step S4, a bottom edge of the titanium cup vacuum bottom is an arc shape and the titanium cup vacuum bottom has a step groove; pressing the titanium cup vacuum bottom into the titanium cup body along an outer side of the inner support ring, and making a press fit, so that an end surface of the titanium cup vacuum bottom is flatly attached to an end surface of a titanium cup body bottom.

S6: welding the titanium cup vacuum bottom: transversely placing the titanium cup body and the titanium cup vacuum bottom, welding the titanium cup body and the titanium cup vacuum bottom by adopting the continuous automatic laser welding equipment having the gas protection function, melting titanium metal at a joint of the titanium cup body and the titanium cup vacuum bottom by a welding laser, and adhering the titanium metal to the inner support ring, so that the titanium cup vacuum bottom and the titanium cup body are completely welded to form an arc-shaped bottom titanium cup.

S7: secondary crystallization: carrying out the secondary crystallization by adopting a vacuum furnace B; adjusting a vacuum degree in the vacuum furnace B to be less than 0.001 Pa, setting temperature in the vacuum furnace B from 1100° C. to 1200° C., and keeping the temperature for 3-10 hours.

S8: vacuumizing: placing the arc-shaped bottom titanium cup in an environment of 800° C.-1000° C. for vacuum processing, and keeping the vacuum processing for 3-10 hours.

S9: detecting a thermal insulation function: inverting the arc-shaped bottom titanium cup after vacuumizing at a hot air outlet of a temperature measuring machine, blowing hot air of 150° C.-260° C. into an inner container of the arc-shaped bottom titanium cup for 35-50 seconds, then detecting temperature outside the arc-shaped bottom titanium cup after blowing; if the detected temperature is 20° C.-25° C., determining that the thermal insulation function of the arc-shaped bottom titanium cup is qualified.

S10: welding a titanium cup bottom plate: taking the pre-treated titanium cup bottom plate and the arc-shaped bottom titanium cup, placing an opening part of the arc-shaped bottom titanium cup into a lower mold connected to a cylinder for positioning, placing the titanium cup bottom plate into the step groove in a bottom of the arc-shaped bottom titanium cup, and tightly pressing the titanium cup bottom plate by an upper mold, meanwhile, injecting argon into a gas containing cavity disposed inside the upper mold, separating welding positions from air, adopting an automatic pulse laser welding equipment for welding, driving the upper mold to rotate by 370 degrees by a rotation driving assembly of the upper mold, meanwhile, driving the arc-shaped bottom titanium cup to rotate by 370 degrees by the upper mold, so that the titanium cup bottom plate and the step groove are completely welded.

S11: surface polishing: fixing the arc-shaped bottom titanium cup, grinding a surface of the arc-shaped bottom titanium cup by a high-speed rotating cloth wheel, setting a rotating speed to 1000-4000 revolutions per minute and a polishing time to 3-100 minutes.

S12: oxidation processing: oxidizing the arc-shaped bottom titanium cup by an anodic oxidation process to finally prepare the arc-shaped bottom titanium cup.

In the step S1, part of the inner support ring is pressed into the bottom end of the titanium cup shell to form an interference fit, so that the inner support ring and the titanium cup shell are fixed by friction force. The inner support ring always supports the titanium cup shell, so that the titanium cup shell keeps high roundness.

In the step S2, when the titanium cup shell and the inner support ring perform the primary crystallization, an excellent crystallization effect is formed on an outer surface of the titanium cup shell, diffusion is easily generated under a vacuum environment of 1100-1200° C., so that the inner support ring and the titanium cup shell are tightly adhered together.

In the step S3, the titanium cup inner container is matched with the titanium cup shell to form a side vacuum layer gap having uniform thickness.

In the step S4, the opening part of the titanium cup inner container and the opening part of the titanium cup shell are welded by adopting the continuous automatic laser welding equipment having the gas protection function, which avoids a welding position from happening oxidation and also avoids an opening welding process from happening deviation, so that uniformity of the side vacuum layer gas is ensured.

In the step S5, the titanium cup vacuum bottom is pressed into the titanium cup body along the outer side of the inner support ring, the inner support ring supports the edge of the titanium cup vacuum bottom, so that roundness of the titanium cup vacuum bottom keeps high roundness, which is conducive to the edge of the titanium cup vacuum bottom being flatly attached to the end surface of the titanium cup body bottom, thereby meeting requirements of high precision welding.

In the step S6, the titanium cup body and the titanium cup vacuum bottom are transversely placed, the welding laser enters the joint from top to bottom, titanium metal materials flows vertically after melting to evenly fill the joint, so that problems such as weld breakage are not prone to happening, and the automatic laser welding equipment having the gas protection function forms an argon protective atmosphere at the welding position, so that generation of oxide films is reduced, and an appearance of a uniform, full and beautiful weld is made.

In the step S7, the secondary crystallization is carried on the arc-shaped bottom titanium cup, so that the oxide films having different thickness on the surface of the arc-shaped bottom titanium cup are removed.

In the step S8, the arc-shaped bottom titanium cup is vacuumized at a high-temperature environment of 800-1000° C., and a high vacuum degree is further obtained.

In the step S9, the vacuum-treated arc-shaped bottom titanium cup is subjected to heat preservation function detection, the arc-shaped bottom titanium cup conforming to heat preservation requirements is subjected to subsequent processing, and a qualification rate of the arc-shaped bottom titanium cup is improved.

In the step S10, the welding titanium cup bottom plate covers the step groove of the arc-shaped bottom titanium cup, so that the appearance is more attractive, pasting by glue is replaced by using pulse laser welding, so that a risk of falling is avoided.

In the step S11 polishing the surface of the arc-shaped bottom titanium cup enhances flatness of the appearance and further enhances an effect of subsequent oxidation treatment.

In the step S12, the arc-shaped bottom titanium cup is subjected to oxidation treatment, so that an arc-shaped bottom titanium cup having a flat and consistent appearance is finally prepared, and the arc-shaped bottom titanium cup is sealed by adopting the welding titanium cup bottom plate, which avoids problems of residual chemical water during oxidation treatment cannot be cleaned, and a color of the surface of the arc-shaped bottom titanium cup after oxidation is uniform.

Furthermore, the inner support ring is made of titanium metal and has a thickness of 1.0-3.0 mm.

The inner support ring is configured to support the titanium cup shell and the titanium cup vacuum bottom, and plays a guiding role in the matching process of the titanium cup shell and the titanium cup vacuum bottom, the inner support ring having the thickness of 1-3 mm can not only ensure its own strength, and deformation is also not easily generated in the crystallization process.

Furthermore, a pre-treated process of the titanium cup shell in the step S1 including:

A1: taking a titanium tube having a diameter of 35-150 mm, preparing the titanium cup shell after cutting a pipe, putting the pipe after cutting into a shaping mold to shape a cup shell, dividing the cup shell, shrinking a top of the cup shell, cutting material heads of the cup shell, correcting the top of the cup shell, correcting a bottom of the cup shell, rolling treads of the top of the cup shell, smoothing the top of the cup shell, smoothing the bottom of the cup shell, and pressing the top of the cup shell.

A2: placing the titanium cup shell in an alkaline degreasing solution for cleaning for 5-30 minutes, after cleaning, placing the titanium cup shell at oven having temperature of 90° C.-120° C. for drying, then polishing a surface of the titanium cup shell by a sanding belt and polishing the surface of the titanium cup shell by a fiber wheel to prepare a titanium cup shell having a smooth surface.

The titanium cup shell prepared by the above process meets requirements of dimensional accuracy and consistency of appearance, which helps to produce a flat and consistent appearance of the arc-shaped bottom titanium cup.

Furthermore, a pre-treated process of the titanium cup inner container in the step S3 including:

B1: finding dents: taking a titanium cup inner container cup, holding a line of sight at 45 degrees with respect to the titanium cup inner container cup under fluorescent light, rotating an opening part of the titanium cup inner container cup by 360 degrees or more, checking whether the dents exist on an outer surface of the titanium cup inner container cup; holding the line of sight at 30 degrees with respect to the titanium cup inner container cup under the fluorescent light, rotating an outer diameter of the titanium cup inner container cup by 360 degrees or more, and checking whether the dents exist on an inner side surface of the titanium cup inner container cup; welding a titanium cup inner container bottom if no dents exist on both the outer side and the inner side surface of the titanium cup inner container cup.

B2: welding the titanium cup inner container bottom: adopting the continuous automatic laser welding equipment having the gas protection function to weld the titanium cup inner container cup and the titanium cup inner container bottom, a welding power is from 200 W to 1500 W, a rotation speed is 1-30 revolutions per minute, and a welding time is from 1 second to 50 seconds, so that forming the titanium cup inner container after welding.

The titanium cup inner container prepared by the above process can remove unqualified titanium cup inner container cups in advance and improve quality of the titanium cup inner container. The continuous automatic laser welding equipment having the gas protection function is adopted for welding, which makes a welding joint of titanium cup inner container cup and the titanium cup inner container bottom uniform and flat and avoids oxidation during welding.

Furthermore, a pre-treated process of the titanium cup vacuum bottom in the step S5 including:

C1: placing the titanium cup vacuum bottom in the alkaline degreasing solution for cleaning for 5-30 minutes, after cleaning, placing the titanium cup vacuum bottom at oven having temperature of 90° C.-120° C. for drying.

C2: adopting a zirconium-based high-temperature getter, fixing the zirconium-based high-temperature getter inside a bottom of the titanium cup vacuum bottom in a spot welding manner.

The titanium cup vacuum bottom prepared by the above process obtains a clean surface of the titanium cup vacuum bottom. The zirconium-based high-temperature getter has a function of absorbing gas and maintaining vacuum. The zirconium-based high-temperature getter is fixed inside the bottom of the titanium cup vacuum bottom by spot welding to avoid the welding marks left by spot welding from being exposed on an outside.

Furthermore, a pre-treated process of the titanium cup bottom plate in the step S10 including:

D1: placing the titanium cup bottom plate in the alkaline degreasing solution for cleaning for 5-30 minutes, after cleaning, placing the titanium cup bottom plate at oven having temperature of 90° C.-120° C. for drying.

D2: crystallizing the titanium cup bottom plate by adopting a vacuum furnace C, adjusting a vacuum degree in the vacuum furnace C to be less than 0.001 Pa, setting temperature in the vacuum furnace C from 1100° C. to 1200° C., and keeping the temperature for 3-10 hours.

After the titanium cup bottom sheet is cleaned, primary crystallization is carried out, so that the titanium cup bottom plate and the titanium cup shell have a consistent appearance.

Furthermore, the lower mold in the step S10 includes a lower mold sleeve, a first bearing, and a lower mold shaft. The lower mold sleeve is matched with the opening part of the arc-shaped bottom titanium cup, one end of the lower mold shaft is rotatably connected with the lower mold sleeve through the first bearing, another end of the lower mold shaft is connected with the cylinder.

The lower mold sleeve is connected with the opening part of the arc-shaped bottom titanium cup, the lower mold shaft is connected with the cylinder, so that the cylinder pushes the lower mold sleeve and the arc-shaped bottom titanium cup to move upwards, and when the lower mold sleeve and the arc-shaped bottom titanium cup rotate, the lower mold shaft is configured to support.

Furthermore, the upper mold in the step S10 includes a positioning sleeve, a movable rod assembly, a gas protection cover, and a second bearing. The positioning sleeve is rotatably connected with the gas protection cover through the second bearing, the positioning sleeve is matched with the bottom of the arc-shaped bottom titanium cup, the movable rod assembly is slidingly connected with the gas protection cover, the movable rod assembly abuts against the titanium cup bottom plate, and the gas containing cavity is formed between the positioning sleeve and the gas protection cover.

The positioning sleeve is matched with the bottom of the arc-shaped bottom titanium cup, so that the arc-shaped bottom titanium cup is accurately limited, the movable rod assembly further compresses the titanium cup bottom plate of the arc-shaped bottom titanium cup, and situation that the titanium cup bottom plate happens deviation during welding rotation is avoided. The argon sinks to the welding position at a bottom of the gas containing cavity, thereby protecting welding parts and avoiding oxidation of metal cups during welding.

Furthermore, a first step and a second step are disposed on the step groove in the step S5, a reinforcing rib is disposed between the first step and the second step, in the step S10, the titanium cup bottom plate is completely welded to the first step, and a zirconium-based high-temperature getter is welded inside the second step.

The first step fixes the titanium cup bottom plate, so that the titanium cup bottom plate does not shake, and the titanium cup bottom plate is closely matched with a welding position of the first step to meet the welding requirement. The second step and the reinforcing rib enhance strength of the titanium cup vacuum bottom, and a problem of deformation after crystallization and vacuum pumping of the titanium cup vacuum bottom is well solved.

Furthermore, the upper mold further includes a gas inlet pipe assembly, light inlet holes are disposed on the gas protection cover, a position of the light inlet holes corresponds to a position of the automatic pulse laser welding equipment, and the gas inlet pipe assembly is inserted into the gas protection cover.

Laser emitted by the automatic pulse laser welding equipment passes through the corresponding light inlet hole, so that a bottom of the metal cup is welded, and the light inlet holes are also configured to exhaust air. The gas inlet pipe assembly injects the argon into the gas containing cavity, so that air in the gas containing cavity is discharged from the light inlet holes, and the oxidation is effectively prevented from occurring at the welding position.

The present disclosure has following significant beneficial effects:

1. The present disclosure provides an inner support ring structure, the inner support ring structure ensures that the titanium cup shell and the titanium cup vacuum bottom have excellent appearance after secondary crystallization while not producing a large degree of out of roundness change. The inner support ring always holds the titanium cup vacuum bottom round and maintains the titanium cup vacuum bottom in a high degree of roundness, and the inner support ring adheres the titanium cup shell and the titanium cup vacuum bottom together and completely weld the titanium cup shell and the titanium cup vacuum bottom together to ensure that the surface of the titanium cup shell and the titanium cup vacuum bottom is flat and smooth.

2. In a welding process, the arc-shaped bottom titanium cup is clamped by adopting the upper mold and the lower mold, the arc-shaped bottom titanium cup is accurately limited, the movable rod assembly further compresses the titanium cup bottom plate disposed on the bottom of the arc-shaped bottom titanium cup, so that the titanium cup bottom plate is prevented from deviating during welding, the argon is injected into the gas containing cavity to form the argon protective atmosphere, generation of the oxide films is reduced, and an appearance having uniform, full and beautiful welding is finally prepared.

3. The titanium cup bottom plate is disposed on the bottom of the arc-shaped bottom titanium cup, the titanium cup bottom plate and the titanium cup vacuum bottom are welded and sealed by laser welding, so that the titanium cup bottom plate is prevented from falling off, and it can be ensured that no chemical water rests in the titanium cup vacuum bottom in the last anodic oxidation process.

DETAILED DESCRIPTION

Figure 1:
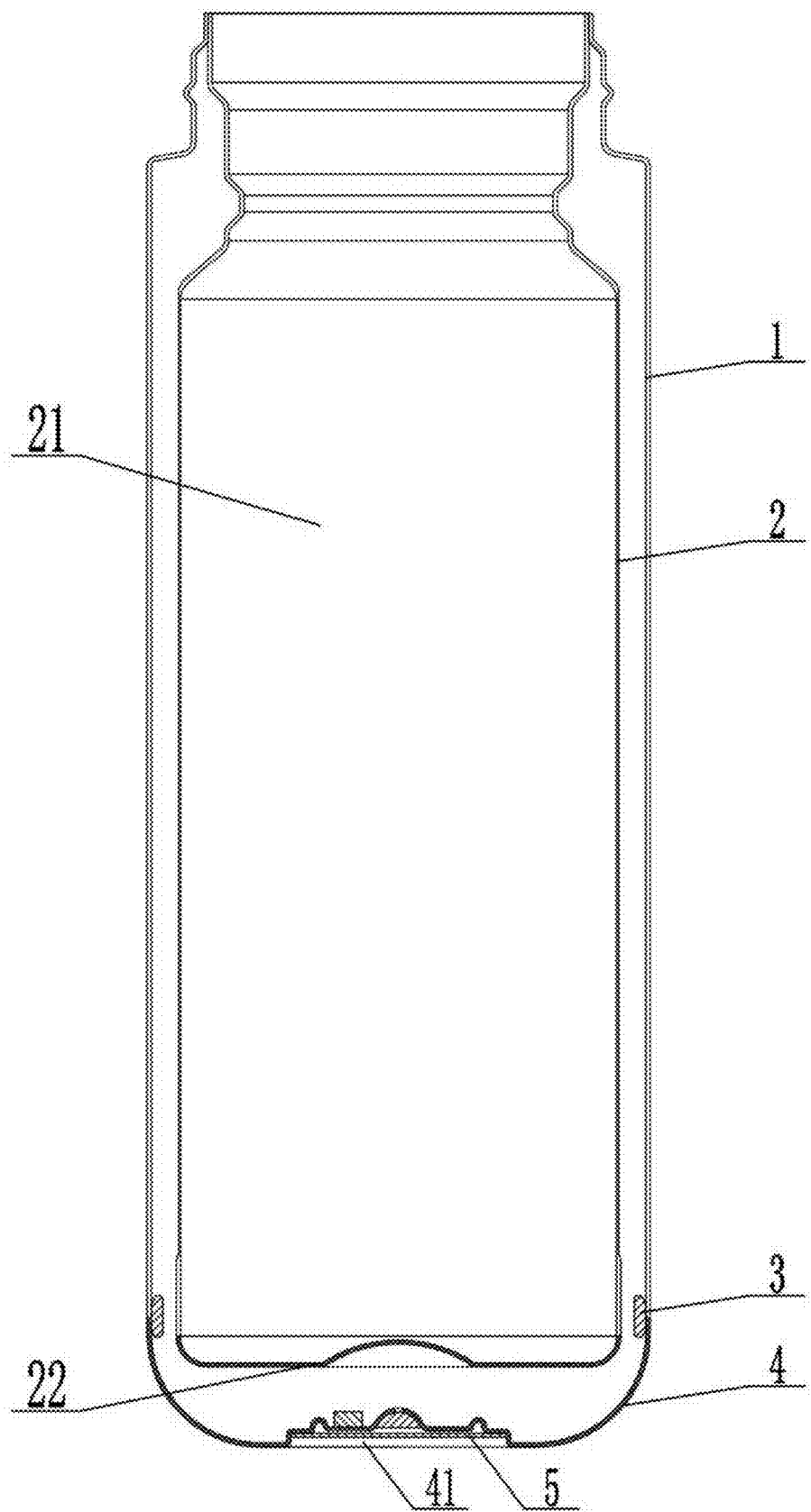
FIG. 1 is a structural schematic diagram of an arc-shaped bottom titanium cup according to one embodiment of the present disclosure.
Figure 2:
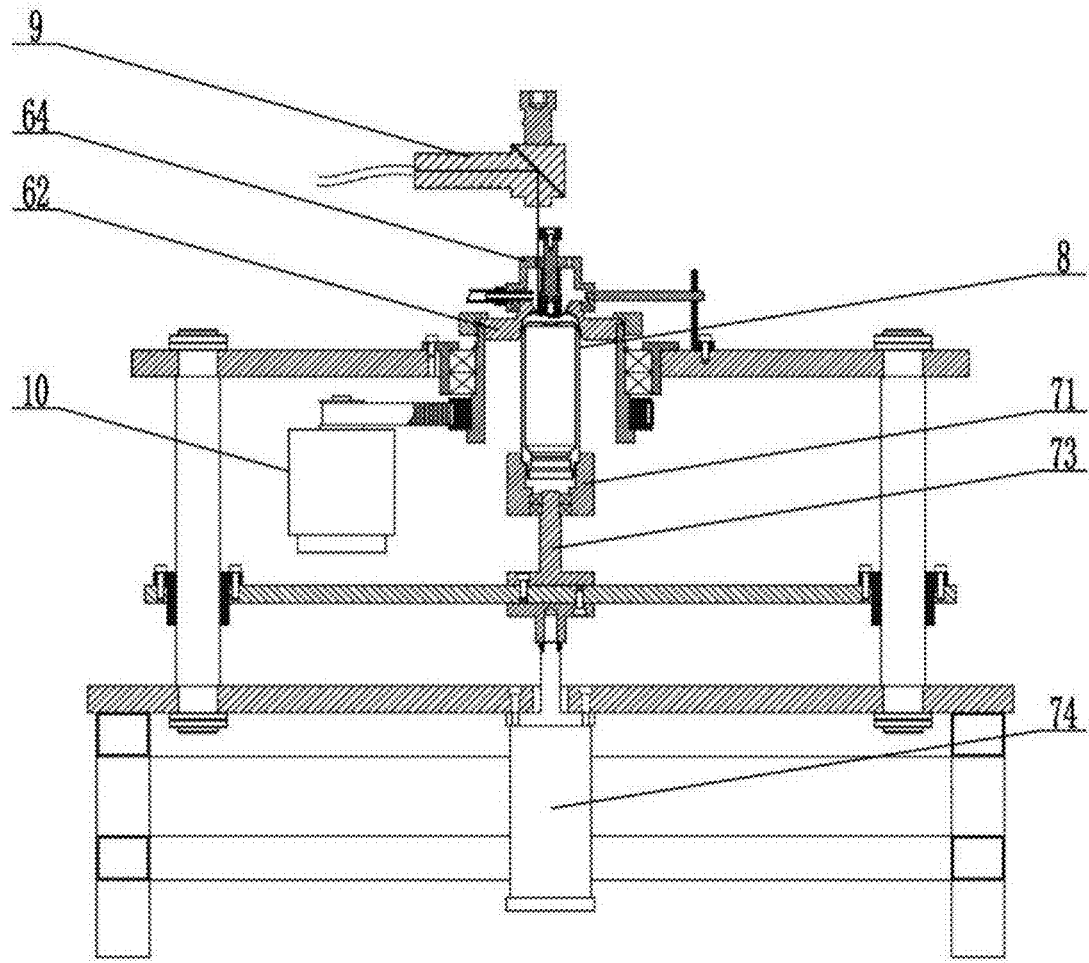
FIG. 2 is a structural schematic diagram of a titanium cup bottom plate and the arc-shaped bottom titanium cup being welding according to one embodiment of the present disclosure.
Figure 3:
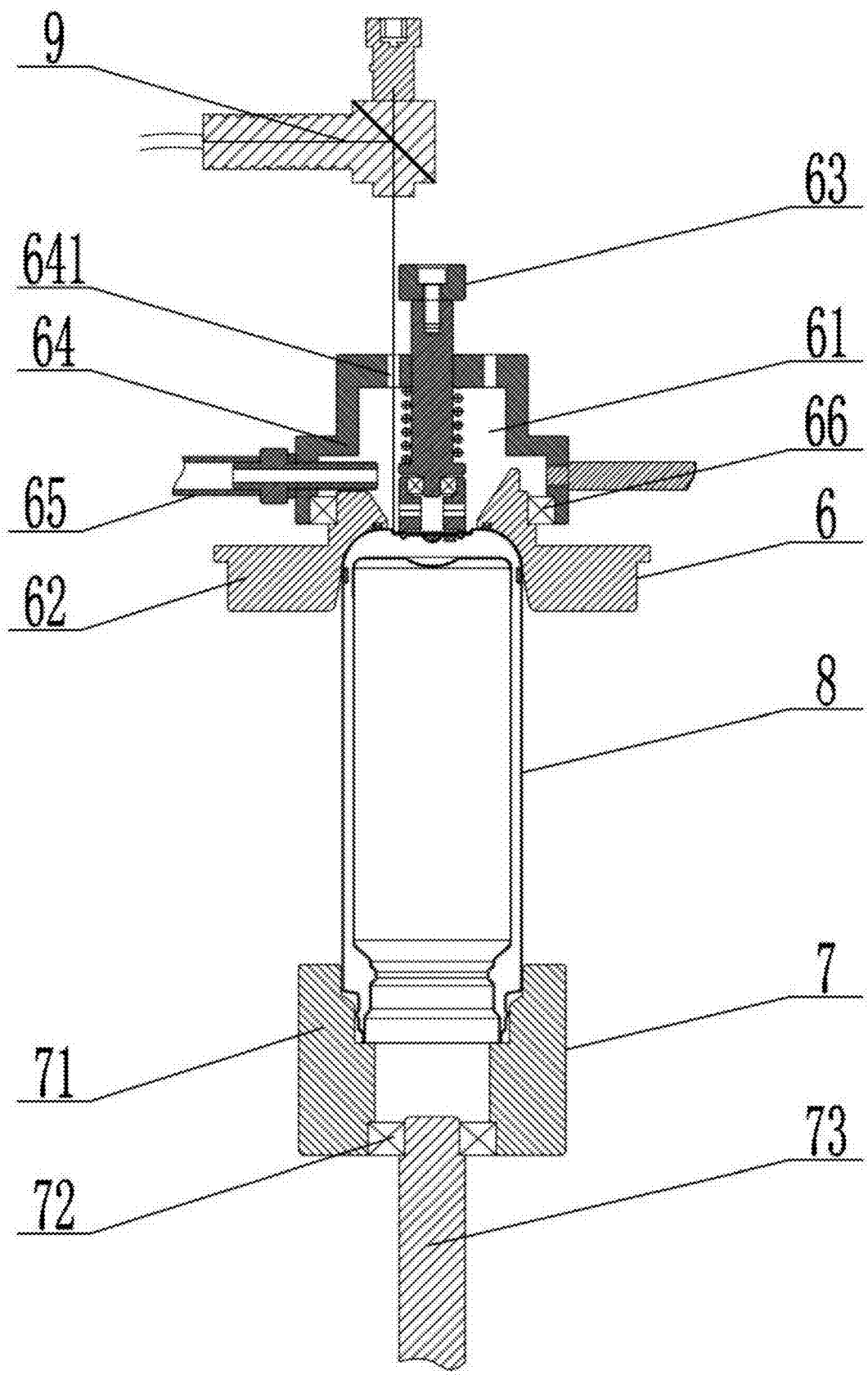
FIG. 3 is a partial structural schematic diagram of the titanium cup bottom plate and the arc-shaped bottom titanium cup being welding according to one embodiment of the present disclosure.
Figure 4:
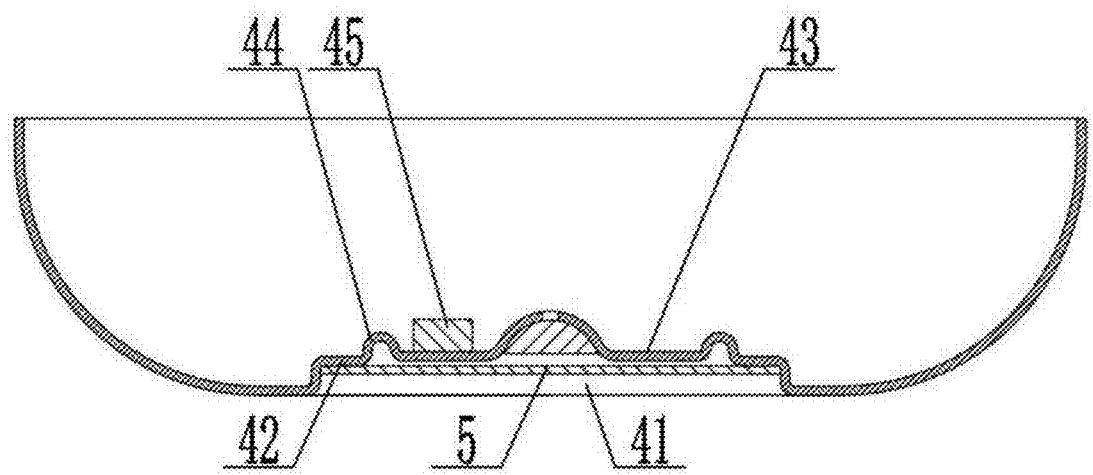
FIG. 4 is a structural schematic diagram of a titanium cup vacuum bottom according to one embodiment of the present disclosure.

The present disclosure is described in further detail below in conjunction with FIGS. 1-4 and detailed description, but are not a limitation of the present disclosure.

Embodiment 1

The present disclosure provides a manufacturing process of an arc-shaped bottom titanium cup, including:

S1: pressing an inner support ring 3: taking the inner support ring 3 and a pre-treated titanium cup shell 1; gradually pressing the inner support ring 3 into the titanium cup shell 1 from a bottom end of the titanium cup shell 1; forming an interference fit between the inner support ring 3 and the titanium cup shell 1, and disposing part of the inner support ring 3 outside the bottom end of the titanium cup shell 1.

S2: primary crystallization: carrying out the primary crystallization on the titanium cup shell 1 and the inner support ring 3 by adopting a vacuum furnace A; adjusting a vacuum degree in the vacuum furnace A to be less than 0.0001 Pa, setting temperature in the vacuum furnace A as 1100° C. and continuously heating the titanium cup shell 1 and the inner support ring 3 for 3 hours, so that the titanium cup shell 1 and the inner support ring 3 are adhered together.

S3: matching: matching a pre-treated titanium cup inner container 2 with the titanium cup shell 1 after the step S2, so that forming a uniform vacuum layer gap between the titanium cup inner container 2 and the titanium cup shell 1.

S4: welding opening parts: welding an opening part of the titanium cup inner container 2 and an opening part of the titanium cup shell 1 by adopting a continuous automatic laser welding equipment having a gas protection function, a welding power is 200 W, a rotation speed is 1 revolution per minute, and a welding time is 1 second, so that a titanium cup body is formed.

S5: pressing a titanium cup vacuum bottom 4: taking the pre-treated titanium cup vacuum bottom 4 and the titanium cup body formed by the step S4, a bottom edge of the titanium cup vacuum bottom 4 is an arc shape and the titanium cup vacuum bottom has a step groove 41; pressing the titanium cup vacuum bottom 4 into the titanium cup body along an outer side of the inner support ring 3, and making a press fit, so that an end surface of the titanium cup vacuum bottom 4 is flatly attached to an end surface of a titanium cup body bottom.

S6: welding the titanium cup vacuum bottom 4: transversely placing the titanium cup body and the titanium cup vacuum bottom 4, welding the titanium cup body and the titanium cup vacuum bottom 4 by adopting the continuous automatic laser welding equipment having the gas protection function, melting titanium metal at a joint of the titanium cup body and the titanium cup vacuum bottom 4 by a welding laser, and adhering the titanium metal to the inner support ring 3, so that the titanium cup vacuum bottom 4 and the titanium cup body are completely welded to form an arc-shaped bottom titanium cup 8.

S7: secondary crystallization: carrying out the secondary crystallization by adopting a vacuum furnace B; adjusting a vacuum degree in the vacuum furnace B to be less than 0.001 Pa, setting temperature in the vacuum furnace B as 1100° C., and keeping the temperature for 3 hours.

S8: vacuumizing: placing the arc-shaped bottom titanium cup 8 in an environment of 800° C. for vacuum processing, and keeping the vacuum processing for 3 hours.

S9: detecting a thermal insulation function: inverting the arc-shaped bottom titanium cup 8 after vacuumizing at a hot air outlet of a temperature measuring machine, blowing hot air of 150° C. into an inner container of the arc-shaped bottom titanium cup 8 for 35 seconds, then detecting temperature outside the arc-shaped bottom titanium cup 8 after blowing; if the detected temperature is 20° C.-25° C., determining that the thermal insulation function of the arc-shaped bottom titanium cup 8 is qualified.

S10: welding a titanium cup bottom plate 5: taking the pre-treated titanium cup bottom plate 5 and the arc-shaped bottom titanium cup 8, placing an opening part of the arc-shaped bottom titanium cup 8 into a lower mold 7 connected to a cylinder 74 for positioning, placing the titanium cup bottom plate 5 into the step groove 41 in a bottom of the arc-shaped bottom titanium cup 8, and tightly pressing the titanium cup bottom plate 5 by an upper mold 6, meanwhile, injecting argon into a gas containing cavity 61 disposed inside the upper mold 6, separating welding positions from air, adopting an automatic pulse laser welding equipment 9 for welding, driving the upper mold 6 to rotate by 370 degrees by a rotation driving assembly 10 of the upper mold 6, meanwhile, driving the arc-shaped bottom titanium cup 8 to rotate by 370 degrees by the upper mold 6, so that the titanium cup bottom plate 5 and the step groove 41 are completely welded.

S11: surface polishing: fixing the arc-shaped bottom titanium cup 8, grinding a surface of the arc-shaped bottom titanium cup 8 by a high-speed rotating cloth wheel, setting a rotating speed as 1000 revolutions per minute and a polishing time is 3 minutes.

S12: oxidation processing: oxidizing the arc-shaped bottom titanium cup 8 by an anodic oxidation process to finally prepare the arc-shaped bottom titanium cup 8.

As a preference, the inner support ring 3 is made of titanium metal and has a thickness of 1.0 mm.

As a preference, a pre-treated process of the titanium cup shell 1 in the step S1 including:

A1: taking a titanium tube having a diameter of 35 mm, preparing the titanium cup shell 1 after cutting a pipe, putting the pipe after cutting into a shaping mold to shape a cup shell, dividing the cup shell, shrinking a top of the cup shell, cutting material heads of the cup shell, correcting the top of the cup shell, correcting a bottom of the cup shell, rolling treads of the top of the cup shell, smoothing the top of the cup shell, smoothing the bottom of the cup shell, and pressing the top of the cup shell.

A2: placing the titanium cup shell 1 in an alkaline degreasing solution for cleaning for 50 minutes, after cleaning, placing the titanium cup shell 1 at oven having temperature of 90° C. for drying, then polishing a surface of the titanium cup shell by a sanding belt and polishing the surface of the titanium cup shell by a fiber wheel to prepare a titanium cup shell having a smooth surface.

As a preference, a pre-treated process of the titanium cup inner container 2 in the step S3 including:

B1: finding dents: taking a titanium cup inner container cup 21, holding a line of sight at 45 degrees with respect to the titanium cup inner container cup 21 under fluorescent light, rotating an opening part of the titanium cup inner container cup 21 by 360 degrees or more, checking whether the dents exist on an outer surface of the titanium cup inner container cup 21; holding the line of sight at 30 degrees with respect to the titanium cup inner container cup 21 under the fluorescent light, rotating an outer diameter of the titanium cup inner container cup 21 by 360 degrees or more, and checking whether the dents exist on an inner side surface of the titanium cup inner container cup 21; welding a titanium cup inner container bottom 22 if no dents exist on both the outer side and the inner side surface of the titanium cup inner container cup 21.

B2: welding the titanium cup inner container bottom 22: adopting the continuous automatic laser welding equipment having the gas protection function to weld the titanium cup inner container cup 21 and the titanium cup inner container bottom 22, a welding power is 200 W, a rotation speed is 1 revolution per minute, and a welding time is 1 second, so that the titanium cup inner container 2 after welding is formed.

As a preference, a pre-treated process of the titanium cup vacuum bottom 4 in the step S5 including:

C1: placing the titanium cup vacuum bottom 4 in the alkaline degreasing solution for cleaning for 5 minutes, after cleaning, placing the titanium cup vacuum bottom 4 at oven having temperature of 90° C. for drying.

C2: adopting a zirconium-based high-temperature getter 45, fixing the zirconium-based high-temperature getter 45 inside a bottom of the titanium cup vacuum bottom 4 in a spot welding manner.

As a preference, a pre-treated process of the titanium cup bottom plate 5 in the step S10 including:

D1: placing the titanium cup bottom plate 5 in the alkaline degreasing solution for cleaning for 5 minutes, after cleaning, placing the titanium cup bottom plate 5 at oven having temperature of 90° C. for drying.

D2: crystallizing the titanium cup bottom plate 5 by adopting a vacuum furnace C, adjusting a vacuum degree in the vacuum furnace C to be less than 0.001 Pa, setting temperature in the vacuum furnace C as 1100° C., and keeping the temperature for 3 hours.

As a preference, the lower mold 7 in the step S10 includes a lower mold sleeve 71, a first bearing 72, and a lower mold shaft 73. The lower mold sleeve 71 is matched with the opening part of the arc-shaped bottom titanium cup 8, one end of the lower mold shaft 73 is rotatably connected with the lower mold sleeve 71 through the first bearing 72, another end of the lower mold shaft 73 is connected with the cylinder 74.

As a preference, the upper mold 6 in the step S10 includes a positioning sleeve 62, a movable rod assembly 63, a gas protection cover 64, and a second bearing 66. The positioning sleeve 62 is rotatably connected with the gas protection cover 64 through the second bearing 66, the positioning sleeve 62 is matched with the bottom of the arc-shaped bottom titanium cup 8, the movable rod assembly 63 is slidingly connected with the gas protection cover 64, the movable rod assembly 63 abuts against the titanium cup bottom plate 5, and the gas containing cavity 61 is formed between the positioning sleeve 62 and the gas protection cover 64.

As a preference, a first step 42 and a second step 43 are disposed on the step groove 41 in the step S5, a reinforcing rib 44 is disposed between the first step 42 and the second step 43, in the step S10, the titanium cup bottom plate 5 is completely welded to the first step 42, and a zirconium-based high-temperature getter 45 is welded inside the second step 43.

As a preference, the upper mold 6 further includes a gas inlet pipe assembly 65, light inlet holes 641 are disposed on the gas protection cover 64, a position of the light inlet holes 641 corresponds to a position of the automatic pulse laser welding equipment 9, and the gas inlet pipe assembly 65 is inserted into the gas protect cover 64.

Embodiment 2

The present disclosure provides a manufacturing process of an arc-shaped bottom titanium cup, including:

S1: pressing an inner support ring 3: taking the inner support ring 3 and a pre-treated titanium cup shell 1; gradually pressing the inner support ring 3 into the titanium cup shell 1 from a bottom end of the titanium cup shell 1; forming an interference fit between the inner support ring 3 and the titanium cup shell 1, and disposing part of the inner support ring 3 outside the bottom end of the titanium cup shell 1.

S2: primary crystallization: carrying out the primary crystallization on the titanium cup shell 1 and the inner support ring 3 by adopting a vacuum furnace A; adjusting a vacuum degree in the vacuum furnace A to be less than 0.0001 Pa, setting temperature in the vacuum furnace A as 1200° C. and continuously heating the titanium cup shell 1 and the inner support ring 10 hours, so that the titanium cup shell 1 and the inner support ring 3 are adhered together.

S3: matching: matching a pre-treated titanium cup inner container 2 with the titanium cup shell 1 after the step S2, so that forming a uniform vacuum layer gap between the titanium cup inner container 2 and the titanium cup shell 1.

S4: welding opening parts: welding an opening part of the titanium cup inner container 2 and an opening part of the titanium cup shell 1 by adopting a continuous automatic laser welding equipment having a gas protection function, a welding power is 1500 W, a rotation speed is 30 revolutions per minute, and a welding time is 50 second, so that a titanium cup body is formed.

S5: pressing a titanium cup vacuum bottom 4: taking the pre-treated titanium cup vacuum bottom 4 and the titanium cup body formed by the step S4, a bottom edge of the titanium cup vacuum bottom 4 is an arc shape and the titanium cup vacuum bottom has a step groove 41; pressing the titanium cup vacuum bottom 4 into the titanium cup body along an outer side of the inner support ring 3, and making a press fit, so that an end surface of the titanium cup vacuum bottom 4 is flatly attached to an end surface of a titanium cup body bottom.

S6: welding the titanium cup vacuum bottom 4: transversely placing the titanium cup body and the titanium cup vacuum bottom 4, welding the titanium cup body and the titanium cup vacuum bottom 4 by adopting the continuous automatic laser welding equipment having the gas protection function, melting titanium metal at a joint of the titanium cup body and the titanium cup vacuum bottom 4 by a welding laser, and adhering the titanium metal to the inner support ring 3, so that the titanium cup vacuum bottom 4 and the titanium cup body are completely welded to form an arc-shaped bottom titanium cup 8.

S7: secondary crystallization: carrying out the secondary crystallization by adopting a vacuum furnace B; adjusting a vacuum degree in the vacuum furnace B to be less than 0.001 Pa, setting temperature in the vacuum furnace B as 1200° C., and keeping the temperature for 10 hours.

S8: vacuumizing: placing the arc-shaped bottom titanium cup 8 in an environment of 1000° C. for vacuum processing, and keeping the vacuum processing for 10 hours.

S9: detecting a thermal insulation function: inverting the arc-shaped bottom titanium cup 8 after vacuumizing at a hot air outlet of a temperature measuring machine, blowing hot air of 260° C. into an inner container of the arc-shaped bottom titanium cup 8 for 50 seconds, then detecting temperature outside the arc-shaped bottom titanium cup 8 after blowing; if the detected temperature is 20° C.-25° C., determining that the thermal insulation function of the arc-shaped bottom titanium cup 8 is qualified.

S10: welding a titanium cup bottom plate 5: taking the pre-treated titanium cup bottom plate 5 and the arc-shaped bottom titanium cup 8, placing an opening part of the arc-shaped bottom titanium cup 8 into a lower mold 7 connected to a cylinder 74 for positioning, placing the titanium cup bottom plate 5 into the step groove 41 in a bottom of the arc-shaped bottom titanium cup 8, and tightly pressing the titanium cup bottom plate 5 by an upper mold 6, meanwhile, injecting argon into a gas containing cavity 61 disposed inside the upper mold 6, separating welding positions from air, adopting an automatic pulse laser welding equipment 9 for welding, driving the upper mold 6 to rotate by 370 degrees by a rotation driving assembly 10 of the upper mold 6, meanwhile, driving the arc-shaped bottom titanium cup 8 to rotate by 370 degrees by the upper mold 6, so that the titanium cup bottom plate 5 and the step groove 41 are completely welded.

S11: surface polishing: fixing the arc-shaped bottom titanium cup 8, grinding a surface of the arc-shaped bottom titanium cup 8 by a high-speed rotating cloth wheel, setting a rotating speed as 4000 revolutions per minute and a polishing time is 100 minutes.

S12: oxidation processing: oxidizing the arc-shaped bottom titanium cup 8 by an anodic oxidation process to finally prepare the arc-shaped bottom titanium cup 8.

As a preference, the inner support ring 3 is made of titanium metal and has a thickness of 3.0 mm.

As a preference, a pre-treated process of the titanium cup shell 1 in the step S1 including:

A1: taking a titanium tube having a diameter of 150 mm, preparing the titanium cup shell 1 after cutting a pipe, putting the pipe after cutting into a shaping mold to shape a cup shell, dividing the cup shell, shrinking a top of the cup shell, cutting material heads of the cup shell, correcting the top of the cup shell, correcting a bottom of the cup shell, rolling treads of the top of the cup shell, smoothing the top of the cup shell, smoothing the bottom of the cup shell, and pressing the top of the cup shell.

A2: placing the titanium cup shell 1 in an alkaline degreasing solution for cleaning for 30 minutes, after cleaning, placing the titanium cup shell 1 at oven having temperature of 120° C. for drying, then polishing a surface of the titanium cup shell by a sanding belt and polishing the surface of the titanium cup shell by a fiber wheel to prepare a titanium cup shell having a smooth surface.

As a preference, a pre-treated process of the titanium cup inner container 2 in the step S3 including:

B1: finding dents: taking a titanium cup inner container cup 21, holding a line of sight at 45 degrees with respect to the titanium cup inner container cup 21 under fluorescent light, rotating an opening part of the titanium cup inner container cup 21 by 360 degrees or more, checking whether the dents exist on an outer surface of the titanium cup inner container cup 21; holding the line of sight at 30 degrees with respect to the titanium cup inner container cup 21 under the fluorescent light, rotating an outer diameter of the titanium cup inner container cup 21 by 360 degrees or more, and checking whether the dents exist on an inner side surface of the titanium cup inner container cup 21; welding a titanium cup inner container bottom 22 if no dents exist on both the outer side and the inner side surface of the titanium cup inner container cup 21.

B2: welding the titanium cup inner container bottom 22: adopting the continuous automatic laser welding equipment having the gas protection function to weld the titanium cup inner container cup 21 and the titanium cup inner container bottom 22, a welding power is 1500 W, a rotation speed is 30 revolutions per minute, and a welding time is 50 seconds, so that forming the titanium cup inner container 2 after welding.

As a preference, a pre-treated process of the titanium cup vacuum bottom 4 in the step S5 including:

C1: placing the titanium cup vacuum bottom 4 in the alkaline degreasing solution for cleaning for 30 minutes, after cleaning, placing the titanium cup vacuum bottom 4 at oven having temperature of 120° C. for drying.

C2: adopting a zirconium-based high-temperature getter 45, fixing the zirconium-based high-temperature getter 45 inside a bottom of the titanium cup vacuum bottom 4 in a spot welding manner.

As a preference, a pre-treated process of the titanium cup bottom plate 5 in the step S10 including:

D1: placing the titanium cup bottom plate 5 in the alkaline degreasing solution for cleaning for 30 minutes, after cleaning, placing the titanium cup bottom plate 5 at oven having temperature of 120° C. for drying.

D2: crystallizing the titanium cup bottom plate 5 by adopting a vacuum furnace C, adjusting a vacuum degree in the vacuum furnace C to be less than 0.001 Pa, setting temperature in the vacuum furnace C as 1200° C., and keeping the temperature for 10 hours.

As a preference, the lower mold 7 in the step S10 includes a lower mold sleeve 71, a first bearing 72, and a lower mold shaft 73. The lower mold sleeve 71 is matched with the opening part of the arc-shaped bottom titanium cup 8, one end of the lower mold shaft 73 is rotatably connected with the lower mold sleeve 71 through the first bearing 72, another end of the lower mold shaft 73 is connected with the cylinder 74.

As a preference, the upper mold 6 in the step S10 includes a positioning sleeve 62, a movable rod assembly 63, a gas protection cover 64, and a second bearing 66. The positioning sleeve 62 is rotatably connected with the gas protection cover 64 through the second bearing 66, the positioning sleeve 62 is matched with the bottom of the arc-shaped bottom titanium cup 8, the movable rod assembly 63 is slidingly connected with the gas protection cover 64, the movable rod assembly 63 abuts against the titanium cup bottom plate 5, and the gas containing cavity 61 is formed between the positioning sleeve 62 and the gas protection cover 64.

As a preference, a first step 42 and a second step 43 are disposed on the step groove 41 in the step S5, a reinforcing rib 44 is disposed between the first step 42 and the second step 43, in the step S10, the titanium cup bottom plate 5 is completely welded to the first step 42, and a zirconium-based high-temperature getter 45 is welded inside the second step 43.

As a preference, the upper mold 6 further includes a gas inlet pipe assembly 65, light inlet holes 641 are disposed on the gas protection cover 64, a position of the light inlet holes 641 corresponds to a position of the automatic pulse laser welding equipment 9, and the gas inlet pipe assembly 65 is inserted into the gas protection cover 64.

Embodiment 3

The present disclosure provides a manufacturing process of an arc-shaped bottom titanium cup, including:

S1: pressing an inner support ring 3: taking the inner support ring 3 and a pre-treated titanium cup shell 1; gradually pressing the inner support ring 3 into the titanium cup shell 1 from a bottom end of the titanium cup shell 1; forming an interference fit between the inner support ring 3 and the titanium cup shell 1, and disposing part of the inner support ring 3 outside the bottom end of the titanium cup shell 1.

S2: primary crystallization: carrying out the primary crystallization on the titanium cup shell 1 and the inner support ring 3 by adopting a vacuum furnace A; adjusting a vacuum degree in the vacuum furnace A to be less than 0.0001 Pa, setting temperature in the vacuum furnace A as 1150° C. and continuously heating the titanium cup shell 1 and the inner support ring 7 hours, so that the titanium cup shell 1 and the inner support ring 3 are adhered together.

S3: matching: matching a pre-treated titanium cup inner container 2 with the titanium cup shell 1 after the step S2, so that forming a uniform vacuum layer gap between the titanium cup inner container 2 and the titanium cup shell 1.

S4: welding opening parts: welding an opening part of the titanium cup inner container 2 and an opening part of the titanium cup shell 1 by adopting a continuous automatic laser welding equipment having a gas protection function, a welding power is 850 W, a rotation speed is 15 revolutions per minute, and a welding time is 25 second, so that a titanium cup body is formed.

S5: pressing a titanium cup vacuum bottom 4: taking the pre-treated titanium cup vacuum bottom 4 and the titanium cup body formed by the step S4, a bottom edge of the titanium cup vacuum bottom 4 is an arc shape and the titanium cup vacuum bottom has a step groove 41; pressing the titanium cup vacuum bottom 4 into the titanium cup body along an outer side of the inner support ring 3, and making a press fit, so that an end surface of the titanium cup vacuum bottom 4 is flatly attached to an end surface of a titanium cup body bottom.

S6: welding the titanium cup vacuum bottom 4: transversely placing the titanium cup body and the titanium cup vacuum bottom 4, welding the titanium cup body and the titanium cup vacuum bottom 4 by adopting the continuous automatic laser welding equipment having the gas protection function, melting titanium metal at a joint of the titanium cup body and the titanium cup vacuum bottom 4 by a welding laser, and adhering the titanium metal to the inner support ring 3, so that the titanium cup vacuum bottom 4 and the titanium cup body are completely welded to form an arc-shaped bottom titanium cup 8.

S7: secondary crystallization: carrying out the secondary crystallization by adopting a vacuum furnace B; adjusting a vacuum degree in the vacuum furnace B to be less than 0.001 Pa, setting temperature in the vacuum furnace B as 1150° C., and keeping the temperature for 7 hours.

S8: vacuumizing: placing the arc-shaped bottom titanium cup 8 in an environment of 900° C. for vacuum processing, and keeping the vacuum processing for 7 hours.

S9: detecting a thermal insulation function: inverting the arc-shaped bottom titanium cup 8 after vacuumizing at a hot air outlet of a temperature measuring machine, blowing hot air of 200° C. into an inner container of the arc-shaped bottom titanium cup 8 for 40 seconds, then detecting temperature outside the arc-shaped bottom titanium cup 8 after blowing; if the detected temperature is 20° C.-25° C., determining that the thermal insulation function of the arc-shaped bottom titanium cup 8 is qualified.

S10: welding a titanium cup bottom plate 5: taking the pre-treated titanium cup bottom plate 5 and the arc-shaped bottom titanium cup 8, placing an opening part of the arc-shaped bottom titanium cup 8 into a lower mold 7 connected to a cylinder 74 for positioning, placing the titanium cup bottom plate 5 into the step groove 41 in a bottom of the arc-shaped bottom titanium cup 8, and tightly pressing the titanium cup bottom plate 5 by an upper mold 6, meanwhile, injecting argon into a gas containing cavity 61 disposed inside the upper mold 6, separating welding positions from air, adopting an automatic pulse laser welding equipment 9 for welding, driving the upper mold 6 to rotate by 370 degrees by a rotation driving assembly 10 of the upper mold 6, meanwhile, driving the arc-shaped bottom titanium cup 8 to rotate by 370 degrees by the upper mold 6, so that the titanium cup bottom plate 5 and the step groove 41 are completely welded.

S11: surface polishing: fixing the arc-shaped bottom titanium cup 8, grinding a surface of the arc-shaped bottom titanium cup 8 by a high-speed rotating cloth wheel, setting a rotating speed as 2500 revolutions per minute and a polishing time is 50 minutes.

S12: oxidation processing: oxidizing the arc-shaped bottom titanium cup 8 by an anodic oxidation process to finally prepare the arc-shaped bottom titanium cup 8.

As a preference, the inner support ring 3 is made of titanium metal and has a thickness of 2.0 mm.

As a preference, a pre-treated process of the titanium cup shell 1 in the step S1 including:

A1: taking a titanium tube having a diameter of 90 mm, preparing the titanium cup shell 1 after cutting a pipe, putting the pipe after cutting into a shaping mold to shape a cup shell, dividing the cup shell, shrinking a top of the cup shell, cutting material heads of the cup shell, correcting the top of the cup shell, correcting a bottom of the cup shell, rolling treads of the top of the cup shell, smoothing the top of the cup shell, smoothing the bottom of the cup shell, and pressing the top of the cup shell.

A2: placing the titanium cup shell 1 in an alkaline degreasing solution for cleaning for 18 minutes, after cleaning, placing the titanium cup shell 1 at oven having temperature of 110° C. for drying, then polishing a surface of the titanium cup shell by a sanding belt and polishing the surface of the titanium cup shell by a fiber wheel to prepare a titanium cup shell having a smooth surface.

As a preference, a pre-treated process of the titanium cup inner container 2 in the step S3 including:

B1: finding dents: taking a titanium cup inner container cup 21, holding a line of sight at 45 degrees with respect to the titanium cup inner container cup 21 under fluorescent light, rotating an opening part of the titanium cup inner container cup 21 by 360 degrees or more, checking whether the dents exist on an outer surface of the titanium cup inner container cup 21; holding the line of sight at 30 degrees with respect to the titanium cup inner container cup 21 under the fluorescent light, rotating an outer diameter of the titanium cup inner container cup 21 by 360 degrees or more, and checking whether the dents exist on an inner side surface of the titanium cup inner container cup 21; welding a titanium cup inner container bottom 22 if no dents exist on both the outer side and the inner side surface of the titanium cup inner container cup 21.

B2: welding the titanium cup inner container bottom 22: adopting the continuous automatic laser welding equipment having the gas protection function to weld the titanium cup inner container cup 21 and the titanium cup inner container bottom 22, a welding power is 850 W, a rotation speed is 15 revolutions per minute, and a welding time is 25 seconds, so that forming the titanium cup inner container 2 after welding.

As a preference, a pre-treated process of the titanium cup vacuum bottom 4 in the step S5 including:

C1: placing the titanium cup vacuum bottom 4 in the alkaline degreasing solution for cleaning for 18 minutes, after cleaning, placing the titanium cup vacuum bottom 4 at oven having temperature of 110° C. for drying.

C2: adopting a zirconium-based high-temperature getter 45, fixing the zirconium-based high-temperature getter 45 inside a bottom of the titanium cup vacuum bottom 4 in a spot welding manner.

As a preference, a pre-treated process of the titanium cup bottom plate 5 in the step S10 including:

D1: placing the titanium cup bottom plate 5 in the alkaline degreasing solution for cleaning for 18 minutes, after cleaning, placing the titanium cup bottom plate 5 at oven having temperature of 110° C. for drying.

D2: crystallizing the titanium cup bottom plate 5 by adopting a vacuum furnace C, adjusting a vacuum degree in the vacuum furnace C to be less than 0.001 Pa, setting temperature in the vacuum furnace C as 1150° C., and keeping the temperature for 10 hours.

As a preference, the lower mold 7 in the step S10 includes a lower mold sleeve 71, a first bearing 72, and a lower mold shaft 73. The lower mold sleeve 71 is matched with the opening part of the arc-shaped bottom titanium cup 8, one end of the lower mold shaft 73 is rotatably connected with the lower mold sleeve 71 through the first bearing 72, another end of the lower mold shaft 73 is connected with the cylinder 74.

As a preference, the upper mold 6 in the step S10 includes a positioning sleeve 62, a movable rod assembly 63, a gas protection cover 64, and a second bearing 66. The positioning sleeve 62 is rotatably connected with the gas protection cover 64 through the second bearing 66, the positioning sleeve 62 is matched with the bottom of the arc-shaped bottom titanium cup 8, the movable rod assembly 63 is slidingly connected with the gas protection cover 64, the movable rod assembly 63 abuts against the titanium cup bottom plate 5, and the gas containing cavity 61 is formed between the positioning sleeve 62 and the gas protection cover 64.

As a preference, a first step 42 and a second step 43 are disposed on the step groove 41 in the step S5, a reinforcing rib 44 is disposed between the first step 42 and the second step 43, in the step S10, the titanium cup bottom plate 5 is completely welded to the first step 42, and a zirconium-based high-temperature getter 45 is welded inside the second step 43.

As a preference, the upper mold 6 further includes a gas inlet pipe assembly 65, light inlet holes 641 are disposed on the gas protection cover 64, a position of the light inlet holes 641 corresponds to a position of the automatic pulse laser welding equipment 9, and the gas inlet pipe assembly 65 is inserted into the gas protection cover 64.

In summary, the above description is merely a preferred embodiment of the present invention. Equivalent changes and modifications made by scopes of the present disclosure are all considered to be within the scopes of the present disclosure.

What is claimed is:

1. A manufacturing process of arc-shaped bottom titanium cup, comprising:

S1: pressing an inner support ring (3): taking the inner support ring (3) and a pre-treated titanium cup shell (1); gradually pressing the inner support ring (3) into the titanium cup shell (1) from a bottom end of the titanium cup shell (1); forming an interference fit between the inner support ring (3) and the titanium cup shell (1), and disposing part of the inner support ring (3) outside the bottom end of the titanium cup shell (1);

S2: primary crystallization: carrying out the primary crystallization on the titanium cup shell (1) and the inner support ring (3) by adopting a vacuum furnace A; adjusting a vacuum degree in the vacuum furnace A to be less than 0.0001 Pa, setting temperature in the vacuum furnace A from 1100° C. to 1200° C. and continuously heating the titanium cup shell (1) and the inner support ring (3) for 3-10 hours, so that the titanium cup shell (1) and the inner support ring (3) are adhered together;

S3: matching: matching a pre-treated titanium cup inner container (2) with the titanium cup shell (1) after the step S2, so that forming a uniform vacuum layer gap between the titanium cup inner container (2) and the titanium cup shell (1);

S4: welding opening parts: welding an opening part of the titanium cup inner container (2) and an opening part of the titanium cup shell (1) by adopting a continuous automatic laser welding equipment having a gas protection function, wherein a welding power is from 200 W to 1500 W, a rotation speed is 1-30 revolutions per minute, and a welding time is from 1 second to 50 seconds, so that a titanium cup body is formed;

S5: pressing a titanium cup vacuum bottom (4): taking the pre-treated titanium cup vacuum bottom (4) and the titanium cup body formed by the step S4, a bottom edge of the titanium cup vacuum bottom (4) is an arc shape and the titanium cup vacuum bottom (4) has a step groove (41); pressing the titanium cup vacuum bottom (4) into the titanium cup body along an outer side of the inner support ring (3), and making a press fat, so that an end surface of the titanium cup vacuum bottom (4) is flatly attached to an end surface of a titanium cup body bottom;

S6: welding the titanium cup vacuum bottom (4): transversely placing the titanium cup body and the titanium cup vacuum bottom (4), welding the titanium cup body and the titanium cup vacuum bottom (4) by adopting the continuous automatic laser welding equipment having the gas protection function, melting titanium metal at a joint of the titanium cup body and the titanium cup vacuum bottom (4) by a welding laser, and adhering the titanium metal to the inner support ring (3), so that the titanium cup vacuum bottom (4) and the titanium cup body are completely welded to form an arc-shaped bottom titanium cup (8);

S7: secondary crystallization: carrying out the secondary crystallization by, adopting a vacuum furnace B; adjusting a vacuum degree in the vacuum furnace B to be less than 0.001 Pa, setting temperature in the vacuum furnace B from 1100° C. to 1200° C., and keeping the temperature for 3-10 hours;

S8: vacuumizing: placing the arc-shaped bottom titanium cup (8) in an environment of 800° C.-1000° C. for vacuum processing, and keeping the vacuum processing for 3-10 hours;

S9: detecting a thermal insulation function: inverting the arc-shaped bottom titanium cup (8) after vacuumizing at a hot air outlet of a temperature measuring machine, blowing hot air of 150° C.-260° C. into an inner container of the arc-shaped bottom titanium cup (8) for 35-50 seconds, then detecting temperature outside the arc-shaped bottom titanium cup (8) after blowing; if the detected temperature is 20° C.-25° C., determining that the thermal insulation function of the arc-shaped bottom titanium cup (8) is qualified;

S10: welding a titanium cup bottom plate (5): taking the pre-treated titanium cup bottom plate (5) and the arc-shaped bottom titanium cup (8), placing an opening part of the arc-shaped bottom titanium cup (8) into a lower mold (7) connected to a cylinder (74) for positioning, placing the titanium cup bottom plate (5) into the step groove (41) in a bottom of the arc-shaped bottom titanium cup (8), and tightly pressing the titanium cup bottom plate (5) by an upper mold (6), meanwhile, injecting argon into a gas containing cavity (61) disposed inside the upper mold, separating welding positions from air, adopting an automatic pulse laser welding equipment (9) for welding, driving the upper mold (6) to rotate by 370 degrees by a rotation driving assembly (10) of the upper mold (6), meanwhile, driving the arc-shaped bottom titanium cup (8) to rotate by 370 degrees by the upper mold (6), so that the titanium cup bottom plate (5) and the step groove are completely welded;

S11: surface polishing: fixing the arc-shaped bottom titanium cup (8), grinding a surface of the arc-shaped bottom titanium cup (8) by a high-speed rotating cloth wheel, setting a rotating speed to 1000-4000 revolutions per minute and a polishing time to 3-100 minutes; and S12: oxidation processing: oxidizing the arc-shaped bottom titanium cup (8) by an anodic oxidation process to finally prepare the arc-shaped bottom titanium cup (8).

2. The manufacturing process of arc-shaped bottom titanium cup according to claim 1, wherein the inner support ring (3) is made of titanium metal and has a thickness of 1.0-3.0 mm.

3. The manufacturing process of arc-shaped bottom titanium cup according to claim 1, wherein a pre-treated process of the titanium cup shell (1) in the step S1 comprising:

A1: taking a titanium tube having a diameter of 35-150 mm, preparing the titanium cup shell (1) after cutting a pipe, putting the pipe after cutting into a shaping mold to shape a cup shell, dividing the cup shell, shrinking a top of the cup shell, cutting material heads of the cup shell, correcting the top of the cup shell, correcting a bottom of the cup shell, rolling treads of the top of the cup shell, smoothing the top of the cup shell, smoothing the bottom of the cup shell, and pressing the top of the cup shell; and A2: placing the titanium cup shell (1) in an alkaline degreasing solution for cleaning for 5-30 minutes, after cleaning, placing the titanium cup shell (1) at oven having temperature of 90° C.-120° C. for drying, then polishing a surface of the titanium cup shell (1) by a sanding belt and polishing the surface of the titanium cup shell (1) by a fiber wheel to prepare a titanium cup shell (1) having a smooth surface.

4. The manufacturing process of arc-shaped bottom titanium cup according to claim 1, wherein a pre-treated process of the titanium cup inner container in the step S3 comprising:

B1: finding dents: taking a titanium cup inner container cup (21), holding a line of sight at 45 degrees with respect to the titanium cup inner container cup (21) under fluorescent light, rotating an opening part of the titanium cup inner container cup (21) by 360 degrees or more, checking whether the dents exist on an outer surface of the titanium cup inner container cup (21); holding the line of sight at 30 degrees with respect to the titanium cup inner container cup (21) under the fluorescent light, rotating an outer diameter of the titanium cup inner container cup (21) by 360 degrees or more, and checking whether the dents exist on an inner side surface of the titanium cup inner container cup (21); welding a titanium cup inner container bottom (22) if no dents exist on both the outer side and the inner side surface of the titanium cup inner container cup (21); and B2: welding the titanium cup inner container bottom (22): adopting the continuous automatic laser welding equipment having the gas protection function to weld the titanium cup inner container cup (21) and the titanium cup inner container bottom (22), a welding power is from 200 W to 1500 W, a rotation speed is 1-30 revolutions per minute, and a welding time is from 1 second to 50 seconds, so that forming the titanium cup inner container (2) after welding.

5. The manufacturing process of arc-shaped bottom titanium cup according to claim 1, wherein a pre-treated process of the titanium cup vacuum bottom (4) in the step S5 comprising:

C1: placing the titanium cup vacuum bottom (4) in an alkaline degreasing solution for cleaning for 5-30 minutes, after cleaning, placing the titanium cup vacuum bottom (4) at oven having temperature of 90° C.-120° C. for drying; and C2: adopting a zirconium-based high-temperature getter (45), fixing the zirconium-based high-temperature getter (45) inside a bottom of the titanium cup vacuum bottom (4) in a spot welding manner.

6. The manufacturing process of arc-shaped bottom titanium cup according to claim 1, wherein a pre-treated process of the titanium cup bottom plate (5) in the step S10 comprising:

D1: placing the titanium cup bottom plate (5) in an alkaline degreasing solution for cleaning for 5-30 minutes, after cleaning, placing the titanium cup bottom plate (5) at oven having temperature of 90° C.-120° C. for drying; and D2: crystallizing the titanium cup bottom plate (5) by adopting a vacuum furnace C, adjusting a vacuum degree in the vacuum furnace C to be less than 0.001 Pa, setting temperature in the vacuum furnace C from 1100° C. to 1200° C., and keeping the temperature for 3-10 hours.

7. The manufacturing process of arc-shaped bottom titanium cup according to claim 1, wherein the lower mold (7) in the step S10 comprises a lower mold sleeve (71), a first bearing (72), and a lower mold shaft (73); the lower mold sleeve (71) is matched with the opening part of the arc-shaped bottom titanium cup (8), one end of the lower mold shaft (73) is rotatably connected with the lower mold sleeve (71) through the first bearing (72), another end of the lower mold shaft (73) is connected with the cylinder (74).

8. The manufacturing process of arc-shaped bottom titanium cup according to claim 1, wherein the upper mold in the step S10 comprises a positioning sleeve (62), a movable rod assembly (63), a gas protection cover (64), and a second bearing (66); the positioning sleeve (62) is rotatably connected with the gas protection cover (64) through the second bearing (66), the positioning sleeve (62) is matched with the bottom of the arc-shaped bottom titanium cup (8), the movable rod assembly (63) is slidingly connected with the gas protection cover (64), the movable rod assembly (63) abuts against the titanium cup bottom plate (5), and the gas containing cavity (61) is formed between the positioning sleeve (62) and the gas protection cover (64).

9. The manufacturing process of arc-shaped bottom titanium cup according to claim 1, wherein a first step (42) and a second step (43) are disposed on the step groove (41) in the step S5, a reinforcing rib (44) is disposed between the first step (42) and the second step (43), in the step S10, the titanium cup bottom plate (5) is completely welded to the first step (42), and a zirconium-based high-temperature getter (45) is welded inside the second step (43).

10. The manufacturing process of arc-shaped bottom titanium cup according to claim 8, wherein the upper mold (6) further comprises a gas inlet pipe assembly (65), light inlet holes (641) are disposed on the gas protection cover (64), a position of the light inlet holes (641) corresponds to a position of the automatic pulse laser welding equipment (9), and the gas inlet pipe assembly (65) is inserted into the gas protection cover (64).

\* \* \* \* \*